United States Patent Office 3,225,783
Patented Dec. 28, 1965

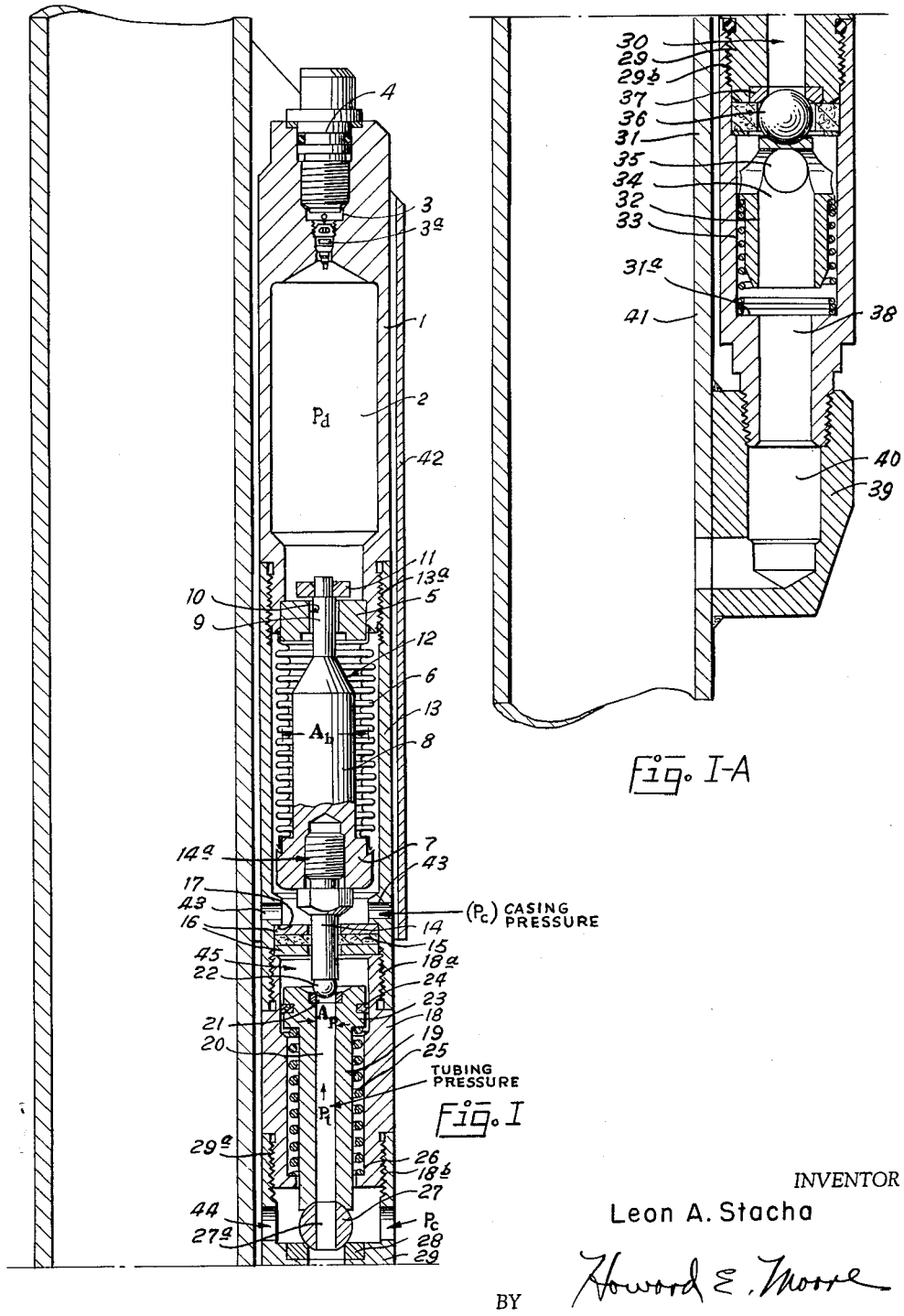

3,225,783
PILOT GAS LIFT VALVE
Leon A. Stacha, Dallas, Tex., assignor to Dresser Industries, Inc., Dallas, Tex., a corporation of Delaware
Filed Oct. 15, 1962, Ser. No. 230,362
6 Claims. (Cl. 137—155)

This invention is concerned with a valve for injecting lifting gas into a tubing string in an oil well, and is particularly concerned with that type of gas lift flow valve generally classified as a pilot valve.

It is a primary object of this invention to provide a large ported pilot valve with minimum spread. This is accomplished by providing a small port in the pilot section of the valve. The spread of a valve is defined as the difference between the opening casing pressure ($Pco$) and the closing casing pressure ($Pcc$). The effect of the pilot port area ($Ap$) on the spread ($Pco-Pcc$) of the valve can best be seen in the relationship $Pco(Ab-Ap)$ which is the force produced by the casing in opening the pilot section. To produce this force the greater the port area ($Ap$) the greater the casing opening pressure ($Pco$) required to overcome the dome pressure ($Pd$). In these relationships $Pco$ equals opening casing pressure, $Pd$ equals dome pressure, $Ab$ equals effective area of the bellows, and $Ap$ equals cross-sectional area of the port 20.

The effective area ($Ab$) of a bellows diaphragm may be defined as that area which determines the mechanical force which will be exerted by a pressure charged bellows diaphragm, which may also be expressed as the arithmetical means between the outside diameter and the inside diameter of a corrugation of a bellows diaphragm (assuming that the corrugations are all the same diameter and spacing).

Therefore, it may be seen that, in effect, the smaller the port ($Ap$), the more area is provided for the casing pressure to act upon in opening the valve. The added spring and tubing pressure may also effect the spread, as hereinafter explained.

Another object of the invention is to provide a simple means of changing the spread of the valve. This is accomplished by the use of a spring located under the hollow valve stem assembly. When the valve closes the closing pressure must overcome the force of the spring, which exerts a force to keep the valve open. By varying the strength of the spring, the valve may be maintained open over a greater spread between the opening casing pressure and the closing casing pressure, thereby varying the spread of the valve.

Another object of the invention is to provide a pilot valve which is pressure operated, i.e. it opens in response to an increase in casing pressure. This is accomplished by exposing a pressure charged bellows to the casing pressure. By controlling the value of the casing pressure, the opening time of the valve may be varied to vary the volume of injected gas to thereby compensate for changing flow characteristics and production capabilities of the well.

Still another object of the invention is to provide a pilot valve which will operate with a "pea-choke" orifice in the gas supply line. This involves the principle of injecting gas continuously into the casing through a small choke to continually build up pressure to the opening pressure of the valve to operate the pressure charged pilot section of the valve. A relatively small opening in the pilot section port will cause the power section to have a wide opening.

A still further object of the invention is to provide a pilot valve which will operate with a time control intermitter to allow gas injection into the casing at predetermined time intervals. This is possible by use of a pressure charged pilot section so that when gas is injected into the casing with the use of the valve structure described herein, casing pressure will rise relatively fast to the opening point of the valve.

Still another object of the invention is to provide a pilot valve which is simple in construction and operation, wherein the power section of the valve is direct acting in response to injected pressure, as distinguished from previous types of pilot valves which are indirect acting. Perfect seals are not required in the operation of the valve disclosed and claimed herein.

Another object of the invention is to provide a pilot valve which is full opening with a snap action, thereby providing an efficient intermittent lift. When the pilot section of the valve opens the main power section of the valve will snap open to full open position without any lag.

Other and further objects of the invention will become apparent upon reading the detailed specification hereinafter following, and by referring to the drawings annexed hereto.

A suitable embodiment of the invention is shown in the attached drawing, wherein:

FIGURES I and IA is a cross-sectional, elevational view of the valve attached to a conventional mandrel, which in turn would be attached to the tubing string extending into a well casing.

Numeral references are employed to designate the various parts shown in the drawings, and like numerals indicate like parts throughout the various figures of the drawings.

The upper pilot section of the valve assembly consists of a pressure dome 1 having a pressure chamber 2 therein, access to which is provided through a passage 3, having a conventional back pressure filler valve 3a threadedly engaged therein, and which is closed by a seal plug 4 threadedly attached therein.

The pressure chamber 2 and the bellows 6 sealingly suspended thereto is charged with the predetermined pressure above atmospheric pressure through the filler valve 3a prior to threading the plug 4 into said passage.

A partition 5 is secured in the lower end of the pressure chamber 2 as by welding, and a conventional metallic bellows diaphragm 6 is sealingly secured to the lower side of the partition 5, and is suspended thereto.

The lower end of the bellows diaphragm 6 is closed by a head member 7, which includes as an integral part thereof a guide stem 8 extending upwardly through the bellows diaphragm 6. The bellows guide 8 includes a suspension stem 9 movably extending through a central passage 10 through the partition 5. Sufficient clearance is provided between the suspension stem 9 and the passage 10 to provide free communication between the pressure chamber 2 and the interior of the bellows 6.

A cross head 11 is secured to the upper end of the suspension stem 9, said cross head being arranged to engage the upper surface of the partition 5, to suspend the guide 9, head 7 and bellows 6, which is secured therto, to prevent overextension of the bellows 6 in the event the housing 13 is removed for inspection of the bellows after being charged.

The bellows diaphragm 6 is preferably filled with an incompressible liquid up to a point above the partition 5, and a conical surface 12 is provided on the guide stem 8 to come into contact with the lower end of the passage 10 through the partition 5, to trap and seal the incompressible liquid in the bellows 6 to protect the corrugations of the bellows against damaging distortion in the event the exterior of the bellows 6 is subjected to excessive pressure.

A tubular bellows housing 13 is threadedly engaged at 13a to the lower end of the pressure dome 1, and is threadedly engaged at the lower end, as indicated at 18a, to the power valve housing 18.

A valve stem 14 is threadedly engaged centrally of the bellows head 7, as indicated at 14a, said valve stem being slidably extended through central passages provided through a resilient seal ring 15, which is supported between back-up rings 16. The seal assembly, consisting of the seal ring and back-up ring 16, are clamped between a shoulder 17 provided inside the bellows housing 13 and the end of the power valve housing 18.

Preferably the resilient seal 15 is of a rubber or plastic composition such as Teflon material, which does not provide a perfect seal, but through which pressure will gradually leak to equalize pressure on each side thereof after a period of time. The importance of this feature will be hereinafter mentioned.

The lower or power valve housing 18 is threadedly secured at 18a to the bellows housing 13 and threadedly attached to the valve seat housing 29 at 18b.

The lower power valve stem 19 has the restricted bore or port 20 provided therethrough, and there is provided in the upper end of the port 20 a valve seat 21 against which the ball valve 22, secured to the lower end of the pilot valve stem 14, may come into sealing contact.

The resilient seal ring 24 is also preferably of rubber or plastic composition such as Teflon material, and is of such a nature as not to provide a perfect seal, is slidingly engaged with the inner wall of the bore of the power valve housing 18, whereby same provides a slidable but imperfect seal with the inner wall of the bore of the housing 18, which in effect provides a piston for limited time until the pressure leaks by the imperfect seal and equalizes on each side thereof.

A coil spring 25 is positioned between the shoulder provided by the flange 23 and an upwardly facing annular shoulder 26, provided in the bore of the power valve housing 18.

A ball valve head 27 is secured to the lower end of the lower power valve stem 19, said valve head having a passage 27a therethrough of the same diameter as the passage 20 through the valve stem 19. The valve head 27 is arranged to sealingly engage the valve seat 28, provided in the upper end of the bore 30 through the valve seat housing 29.

The valve seat housing 29 is threadedly engaged at its upper end to the power valve housing 18, and threadedly engaged at its lower end to the check valve housing 31, as indicated at 29b.

It will thus be seen that the smaller diameter port 20 through the power valve stem 19 is in communication with the larger diameter port 30 through the valve seat housing 29, but that the valve head 27, seals off communication of axial ports 20 and 30 with the lateral ports 44, which communicate with the casing annulus exteriorly of the valve assembly.

The spring 25 is contracted when the valve head 27 is in contact with the valve seat 28 as shown in FIGURE I, and is expanded when the valve head 27 is moved off the seat 28 so that the spring 25 opposes the closing of the valve 27 after it has been opened for the purpose hereinafter mentioned.

The check valve attached below the valve assembly just described is of conventional construction, and includes a check valve housing 31 having a shoulder providing a spring seat 31a formed in the bore thereof.

A hollow check valve body 32 is movably positioned in the bore of the check valve housing 31, and is urged upwardly by a spring 33 having its lower end seated against the spring seats 31a, and the upper end is seated against a downwardly facing shoulder formed about the body 32. The central passage 34 through the check valve body 32 communicates with laterally extending ports 35, provided through the wall of the body 32. A ball valve head 36 is secured to the upper end of the body above the lateral ports 35. The ball valve 36 is urged into sealing engagement with the seat 37 provided in the lower end of the bore 30 so as to normally close the port 30 except when sufficient pressure is exerted against the upper surface of the valve ball 36 to overcome the spring 33 and move same downwardly, to permit fluid to pass through the port 30, lateral passages 35, passage 34, and into the bore of the mandrel 41 which is connected to the tubing string.

The valve assembly is threadedly engaged in a receptacle 39 provided as a part of the hollow mandrel 41, which mandrel is attached in and communicates with the bore of the tubing string extending into the well. A passage 38 is provided through the check valve housing which communicates with a passage 40 provided through the receptacle 39, which in turn communicates with the bore of the mandrel 41. The mandrel assembly includes a sleeve-like receptacle 42 on the outer side thereof which receives the valve assembly and retains same in place and protects same.

Lateral passages 43 are provided through the wall of the bellows housing 13 in communication with the exterior of the bellows diaphragm 6. These passages are in communication with the casing annulus surrounding the valve and expose the exterior surface of the bellows 6 to casing pressure so that the bellows 6 is contracted to lift the valve head 22 off the seat 21 when the casing pressure becomes greater than the charged pressure in the pressure chamber 2 and bellows 6.

There are also lateral passages 44 provided through the wall of the valve seat housing 29 which communicate with the casing annulus and allow the injection of gas from the casing annulus through the large port 30, and the check valve therebelow, into the tubing, when the hollow valve ball 27 is lifted off the seat 28 in the manner hereinafter described.

The operation and function of the valve assembly hereinbefore described is as follows:

The pressure chamber 2 and bellows 6 are charged to a predetermined pressure above atmospheric, and when the pressure in the casing annulus exteriorally of the valve rises to a value above the charged pressure of the pilot section of the valve, the bellows 6 is caused to contract and lift the valve head 22 off the seat 21.

Tubing pressure is also a factor in opening pilot valve 22, because tubing pressure will be present in passages 30 and 20 due to the tubing pressure leaking by check valve 36. If desired the check valve could be of the velocity type which is normally open.

The extended bellows 6 has caused the valve head 22 to contact the seat 21 and hold the power valve stem 19 downwardly against force of the spring 25 to close the port 30 by the hollow head 27. The contraction of the bellows 6 assisted by tubing pressure raises the valve head 22 out of engagement with the power valve stem 19, allowing the spring 25 in conjunction with casing pressure, as hereinafter described, to move the valve head 27 off the seat 28 with a snap action to full open position until the seat 21 contacts ball valve head 22.

A matter of importance is the area or volume 45 between the seals 15 and 24. When the pilot valve head 22 is closed against the seat 21, and valve head 27 is closed against seat 28, the operating volume 45 is at casing pressure due to the imperfect seals 15 and 24 which permit pressure from ports 43 and 44 to leak thereby. When the pilot valve head 22 is lifted off the seat 21 in the manner hereinbefore described, the operating volume 45 drops to tubing pressure through the bore 20 of the main valve stem 19, thereby creating a pressure differential across the seal 24, the check valve ball 36 having been pushed away from the seat 37 at the moment the valve 22 is opened. The pressure differential between the operating volume 45 and the area below the flange 23 about the stem 19 is momentary, but sufficient to assist the spring 25 in moving the valve head 27 off the seat 28 with a snap action. By varying the strength of spring 25 the open time of valve 27 may be varied. Further by varying the diameter of ports 30 or 20, the pressure charge of bellows 6, or the casing pressure, the opening and closing times of valve 27 may be varied.

When the power valve opens by moving the valve head 27 off the seat 28, gas is injected through the check valve into the tubing.

As previously mentioned, a time cycle intermitter or a choke on the gas supply line may be employed to determine the frequency of injection of gas and cycles of operation.

After the pressure in the casing has been lowered by injection of gas into the tubing to the closing pressure of the pilot valve, i.e., below the charged pressure in the pressure chamber 2, the bellows 6 will expand, moving the valve stem 16 downwardly and thereby moving the valve stem 19 downwardly to cause the valve head 27 to come into sealing contact with the valve seat 28, contracting the spring 25, and placing the valve assembly in condition for another cycle of operation as hereinbefore described.

It will be seen that I have provided a pilot valve assembly which includes a large ported valve with a minimum spread wherein the spread may be easily varied by changing the strength of the spring about the power valve stem, which is pressure operated by pressure built up in the casing, thereby permitting accurate surface control so that it may be operated with a time controlled intermitter or a pressure control intermitter from the surface, which is simple in construction, is opened by a snap action to full open position, and which is closed quickly without floating action upon the pressure in the casing being lowered below the charged pressure of the pilot section.

It will be understood that other and further embodiments of the invention may be devised without departing from the spirit and scope of the appended claims.

Having described my invention, I claim:

1. In a flow valve arranged to be mounted on a tubing string, a housing; a pressure chamber in the housing; a bellows diaphragm suspended below the pressure chamber and communicating therewith; an upper valve stem and head attached to the end of the bellows diaphragm; a partition in the housing having a passage therethrough through which the upper valve stem extends; a restricted fluid flow passage between the stem and the passage; a port through the wall of the housing above the partition, communicating with the exterior of the bellows; a lower valve stem; a piston head on the upper end of the lower valve stem slidably engaging the wall of the housing; a valve head on the lower end of the lower valve stem; an axial bore through said lower valve stem, piston and valve head; a chamber between the partition and the piston about the upper valve stem; a valve seat in the upper end of the bore arranged to receive the upper valve head, said valve seat being secured to and movable with the bore; spring means arranged between the lower valve stem and the housing to normally urge the valve stem upwardly in the housing; an outlet passage in the lower end of the housing; a valve seat in the upper end of the outlet passage arranged to receive the valve head on the lower valve stem to cause communication between the bore and the outlet passage; at least one lateral passage through the wall of the housing communicating with the lower valve head and arranged to communicate with the outlet passage when the lower valve head is lifted off the seat in the upper end of the outlet passage; the pressure chamber and bellows diaphragm being sealed at a pressure sufficient to seat the upper valve head on the seat in the bore, and force the lower valve head against the seat in the housing against the spring means.

2. The combination called for in claim 1 wherein a restricted fluid flow passage is provided between the inner wall of the housing and the piston head.

3. In a gas lift flow valve, a housing; a pressure responsive member mounted in the housing; an upper valve stem and head attached to the end of the pressure responsive member; partition means attached to the housing and having a passage therethrough slidably receiving the upper valve stem; a restricted fluid flow passage through the partition; a lower valve stem disposed in the housing; a piston on the upper end of the lower valve stem slidably engaging the inner wall of the housing; a valve head on the lower end of the lower valve stem; an axial passage through the piston, lower valve stem and head; a valve seat in the upper end of the axial bore arranged to receive the valve head on the upper valve stem, said valve seat being secured to and movable with the bore; elastically retractable means arranged between the housing and the lower valve stem to urge the stem upwardly in the housing; an outlet passage through the lower end of the housing; a valve seat in the upper end of the outlet passage arranged to receive the lower valve head; at least one lateral port through the wall of the housing above the partition communicating with the pressure responsive member; at least one lateral port through the wall of the housing communicating with the lower valve head, and arranged to communicate with the outlet passage when the lower valve head is lifted off the seat in the upper end of the outlet passage; a chamber between the partition and the piston and about the upper valve stem; the said pressure responsive member being biased sufficiently to urge the upper valve head into contact with the seat in the bore, and to urge the lower valve head downwardly against the elastically retractable means into engagement with the seat in the outlet passage.

4. The combination called for in claim 3 wherein the restricted passage through the partition is between the outer side of the stem and the passage through the partition.

5. The combination called for in claim 4 wherein the pressure responsive member is a pressure charged bellows diaphragm, and the elastically retractable means is a helical spring arranged about the lower valve stem between the piston and the housing.

6. The combination called for in claim 3 wherein a restricted flow passage is provided between the wall of the housing and the piston.

References Cited by the Examiner

UNITED STATES PATENTS

| | | | |
|---|---|---|---|
| 2,748,792 | 6/1956 | Davis | 137—155 |
| 2,779,352 | 1/1957 | Lung | 137—490 |
| 2,994,335 | 8/1961 | Dudley | 137—155 |
| 3,092,131 | 6/1963 | Lamb | 137—155 |

ISADOR WEIL, *Primary Examiner.*

WILLIAM F. O'DEA, *Examiner.*